US011813705B2

(12) United States Patent
Reinthaler et al.

(10) Patent No.: US 11,813,705 B2
(45) Date of Patent: Nov. 14, 2023

(54) METHOD AND APPARATUS FOR MONITORING A NON-MELTING WELDING ELECTRODE OF AN AUTOMATIC ARC WELDING APPARATUS

(71) Applicant: Fronius International GmbH, Pettenbach (AT)

(72) Inventors: Guenther Reinthaler, Pettenbach (AT); Martin Leuchtenmueller, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 18/019,328

(22) PCT Filed: Aug. 19, 2021

(86) PCT No.: PCT/EP2021/072983
§ 371 (c)(1),
(2) Date: Feb. 2, 2023

(87) PCT Pub. No.: WO2022/038210
PCT Pub. Date: Feb. 24, 2022

(65) Prior Publication Data
US 2023/0241704 A1 Aug. 3, 2023

(30) Foreign Application Priority Data
Aug. 20, 2020 (EP) .................................... 20191952

(51) Int. Cl.
B23K 9/095 (2006.01)
B23K 9/167 (2006.01)
(Continued)

(52) U.S. Cl.
CPC ............ B23K 9/0956 (2013.01); B23K 9/167 (2013.01); G06T 7/001 (2013.01); G06T 7/55 (2017.01);
(Continued)

(58) Field of Classification Search
CPC ........ B23K 9/0956; B23K 9/167; G06T 7/55; G06T 7/62; G06T 7/70; G06T 7/001;
(Continued)

(56) References Cited

U.S. PATENT DOCUMENTS 4,488,032 A * 12/1984 Case, Jr. .............. B23K 9/0956
219/130.21
4,578,561 A * 3/1986 Corby, Jr. ............ B23K 9/0956
219/136
(Continued)

FOREIGN PATENT DOCUMENTS

DE 10 2012 214249 A1 2/2014
JP H05-200556 A 8/1993
(Continued)

OTHER PUBLICATIONS

International Search Report in PCT/EP2021/072983, dated Dec. 6, 2021.
(Continued)

*Primary Examiner* — Eric S Stapleton
(74) *Attorney, Agent, or Firm* — Collard & Roe, P.C.

(57) ABSTRACT

In a method and apparatus for monitoring a non-melting welding electrode of an automated arc welding apparatus, using at least one camera, welding electrode images are captured and processed, and the state of the welding electrode is concluded therefrom. The images are captured during a welding process carried out with the arc welding apparatus, the images are reprocessed, and the arc of the welding process is extracted. The shape of the electrode end (Continued)

is determined from the reprocessed images and compared with a predefined shape of the electrode end. The images are reprocessed by capturing at least two images with different exposure times, cutting out and/or weighting partial areas from the at least two images with different exposure times, and combining them to form a composite image. If the determined shape of the electrode end deviates from the predefined shape of the electrode end, a signal is output.

19 Claims, 3 Drawing Sheets

(51) Int. Cl.
   *G06T 7/00* (2017.01)
   *G06T 7/55* (2017.01)
   *G06T 7/62* (2017.01)
   *G06T 7/70* (2017.01)
(52) U.S. Cl.
   CPC .............. *G06T 7/62* (2017.01); *G06T 7/70* (2017.01); *G06T 2207/10144* (2013.01); *G06T 2207/20212* (2013.01); *G06T 2207/30108* (2013.01)
(58) Field of Classification Search
   CPC . G06T 2207/10144; G06T 2207/20212; G06T 2207/30108
   USPC .......................................................... 219/75
   See application file for complete search history.

(56) References Cited

U.S. PATENT DOCUMENTS

| | | | | |
|---|---|---|---|---|
| 4,590,356 A | * | 5/1986 | Povlick | B23Q 35/128 901/42 |
| 4,595,820 A | * | 6/1986 | Richardson | B23K 9/0956 219/130.21 |
| 4,644,131 A | * | 2/1987 | Richardson | B23K 9/296 219/130.01 |
| 4,649,426 A | * | 3/1987 | Bolstad | G01N 21/4738 348/90 |
| 4,698,484 A | * | 10/1987 | Babcock | B23K 9/0956 219/136 |
| 4,739,404 A | * | 4/1988 | Richardson | B23K 9/0956 348/90 |
| 4,918,517 A | * | 4/1990 | Burgoon | B23K 9/0956 348/90 |
| 4,943,702 A | * | 7/1990 | Richardson | B23K 9/0956 219/130.01 |
| 5,061,841 A | * | 10/1991 | Richardson | B23K 9/0956 219/130.01 |
| 8,953,033 B2 | * | 2/2015 | Yamane | G01B 11/08 348/90 |
| 2012/0200695 A1 | * | 8/2012 | Yamane | B23K 11/3063 348/90 |
| 2013/0342678 A1 | * | 12/2013 | McAninch | B23K 9/0956 348/90 |
| 2016/0175964 A1 | * | 6/2016 | Penoyer | B23K 9/0956 219/137 R |
| 2016/0193681 A1 | * | 7/2016 | Pesme | B23K 9/1274 219/136 |
| 2016/0207135 A1 | * | 7/2016 | Beeson | B23K 9/322 |
| 2016/0214198 A1 | * | 7/2016 | Hsu | G01C 25/00 |
| 2016/0250706 A1 | * | 9/2016 | Beeson | B23K 9/322 434/234 |
| 2016/0267806 A1 | * | 9/2016 | Hsu | G09B 19/24 |
| 2017/0036288 A1 | * | 2/2017 | Albrecht | B23K 31/125 |
| 2019/0123517 A1 | * | 4/2019 | Shimamura | G06T 7/0006 |

FOREIGN PATENT DOCUMENTS

| | | |
|---|---|---|
| JP | H09-314333 A | 12/1997 |
| JP | 2018-138309 A | 9/2018 |
| WO | 2016/044874 A1 | 3/2016 |

OTHER PUBLICATIONS

Uropean Search Report in EP 20191952.9-1016, dated Feb. 23, 2021, with English translation of relevant parts.
M.S.McGough and C. Burgoon, "Visual Monitoring of Remote Welding Operations", Welding Journal, American Welding Society, Miami, FL, US, vol. 69, No. 12, Dec. 1, 1990 (Dec. 1, 1990), pp. 23-28.

* cited by examiner

METHOD AND APPARATUS FOR MONITORING A NON-MELTING WELDING ELECTRODE OF AN AUTOMATIC ARC WELDING APPARATUS

CROSS REFERENCE TO RELATED APPLICATIONS

This application is the National Stage of PCT/EP2021/072983 filed on Aug. 19, 2021, which claims priority under 35 U.S.C. § 119 of European Application No. 20191952.9 filed on Aug. 20, 2020, the disclosure of which is incorporated by reference. The international application under PCT article 21(2) was not published in English.

The invention relates to a method for monitoring a non-melting welding electrode, in particular a tungsten electrode, of an automated arc welding apparatus, in particular a TIG welding apparatus, wherein images of the welding electrode are captured with the aid of at least one camera and the images are processed and the state of the welding electrode is concluded therefrom, and the images of the welding electrode are captured during a welding process carried out with the arc welding apparatus, the images are reprocessed and the arc of the welding process is extracted, and the shape of the end of the welding electrode is determined from the reprocessed images and compared with a predefined shape of the end of the welding electrode.

Furthermore, the invention relates to an apparatus for monitoring a non-melting welding electrode, in particular a tungsten electrode, of an automated arc welding apparatus, in particular a TIG welding apparatus, having at least one camera for capturing images of the welding electrode and an image processing device for processing the images and for obtaining a conclusion therefrom as to the state of the welding electrode, the at least one camera being designed for capturing the images of the welding electrode during a welding process carried out with the arc welding apparatus, the image processing device being designed for reprocessing the images and extracting the arc of the welding process and for determining the shape of the end of the welding electrode from the reprocessed images and for comparison with a predefined shape of the end of the welding electrode.

The invention relates to automated arc welding methods and apparatuses with non-melting welding electrodes, in particular TIG welding methods and TIG welding apparatuses with tungsten electrodes. The term automated arc welding apparatuses includes, in particular, robot-controlled arc welding apparatuses or welding devices which are arranged on a manipulator, such as a robot, linear running gear, bogie or the like, and are moved automatically along a desired welding path.

Before the start of a welding process, the state of the non-melting welding electrode is usually checked by the welder and, if necessary, the welding electrode is sharpened or even renewed.

In spot welding processes, visual assessment of the state of the spot welding electrodes is known. For example, U.S. Pat. No. 8,953,033 B2 describes an apparatus for inspecting the wear of spot-welding electrodes via corresponding images taken with a camera and subsequent image processing. In arc welding processes, however, because of the very bright arc, a visual assessment of the welding region and in particular of the welding electrode on which the arc is burning is particularly difficult.

For example, WO 2016/044874 A1 shows a method for monitoring an arc welding process, in which the images captured with a camera are divided into a plurality of differently exposed partial images and assembled again. This makes it possible to observe and assess the weld during the welding process despite the particularly bright arc.

In automated welding systems, the welding process can also be observed by means of a camera in order, for example, to carry out a positional control of the welding torch with respect to the workpiece. For example, JP 2018-138309 A describes a welding apparatus and a welding method with a non-melting electrode, wherein an image of the welding point is captured and, based on the captured image, a determination or control of the position of the welding wire with respect to the non-melting electrode of the welding torch is performed.

JP H05 200556 A describes a method for monitoring a non-melting welding electrode of an arc welding apparatus, the welding current being reduced for a short time in order to reduce the influence of the flash arc, so that the welding process is not greatly influenced but the brightness of the arc is reduced. During the current reduction phase, an image of the welding electrode is captured and reprocessed by means of an optical bandpass filter.

JP H09 314333 A has disclosed another monitoring method, in which the disturbing influence of the arc is reduced by arranging a light source behind the welding electrode, as a result of which the camera arranged in front of the welding electrode can capture a contour of the welding electrode. In addition, an infra-red filter is used and the image of the welding electrode is captured shortly after the arc is extinguished if the welding electrode still emits a corresponding heat radiation.

In some automated welding processes, for example in the cladding of pipeline pipes by means of appropriate welding devices, very long-lasting automated welding processes are carried out in order to line the inside of the pipes of the pipelines. Although such welding processes are monitored by cameras, the wear of the non-melting electrode, in particular the tungsten electrode, is only assessed visually in the pauses of the welding process or is estimated indirectly by means of arc parameters (arc voltage, arc current). However, no reliable statement about the actual state of the welding electrode can be made during the relatively long welding phases between the pauses.

The object of the present invention is therefore to provide a method and an apparatus of the above-mentioned type for monitoring a non-melting welding electrode of an automated arc welding apparatus, which allows a reliable, timely and preferably continuous assessment of the wear of the non-melting welding electrode during the welding process without interruption. As a result, it should be possible to achieve automated welding processes with longer service lives or to detect wear phenomena on the welding electrodes more quickly and thus to achieve higher welding qualities. Disadvantages of known methods and devices are to be reduced or avoided.

The object according to the invention is achieved by a monitoring method as the above-mentioned in which the images are reprocessed by capturing at least two images with different exposure times, cutting out and/or weighting partial areas from the at least two images with different exposure times, and combining them to form a composite image and, in the event of a deviation of the determined shape of the end of the welding electrode from the predefined shape of the end of the welding electrode, a signal is output. The method according to the invention provides for the camera images captured during the arc welding process to be reprocessed in a suitable manner by capturing at least two images with different exposure times, from which at least two images with different exposure times are cut out and/or weighted, and combined to form a composite image. By means of such a method, the flash arc can be extracted optimally from the resultant image and nevertheless a meaningful image can be achieved which allows an optimum visual assessment of the state or of the shape and, if need be, of the position of the welding electrode or of the electrode tip. A weighting of the images has the advantage that only images of suitable quality are used for this purpose. In this case, the quality is assessed on the basis of image parameters, such as, for example, grey levels, which have an influence on the calculation method for the composite images. As a result, the shape of the end of the welding electrode can be determined from the images and automatically compared with a predefined shape of the end of a welding electrode. In the event of a corresponding deviation of the actual shape from the predefined desired shape of the end of the welding electrode, a signal is output allowing the welder or the welding device to detect the wear of the welding electrode or the degree of wear. Depending on the type of deviation, wear of the welding electrode or soiling of the welding electrode due to adhering welding spatter or immersion of the welding electrode in the molten bath can be detected immediately or virtually in real time during the welding process. After the detection, appropriate measures can be taken to improve the state of the welding electrode (for example by cleaning or grinding the end of the welding electrode) or to replace the welding electrode. If necessary, the ongoing welding process can also be stopped if otherwise the desired welding quality can no longer be guaranteed. Of course, the monitoring method can also be carried out when the welding process is not running, in order to provide a reference for the evaluation of the camera images during the welding process with a burning arc. The method according to the invention can be implemented in a relatively simple and cost-effective manner on the basis of corresponding computer powers which are present in any case in modern welding current sources. The camera or a plurality of cameras required for capturing the images are generally present in automated arc welding apparatuses anyway. The images can also be processed on external computers or the like.

Advantageously, the position of the end of the welding electrode is also determined from the reprocessed images and compared with a predefined position of the end of the welding electrode, and a signal is output when the determined position of the end of the welding electrode deviates from the predefined position of the end of the welding electrode. In addition to the shape of the non-melting welding electrode, the position is also an important criterion that can influence the welding quality. When an impermissible deviation of the actual position or current position of the end of the welding electrode from the desired position or target position is detected, a correction of the position of the welding torch with respect to the workpiece or a correction of the position of the non-melting welding electrode in the welding torch or an exchange of the welding electrode (for example when the latter is bent) can be carried out automatically.

Furthermore, the shape of the end of the welding electrode can be determined by the angle of a tip of the welding electrode and/or the length of the welding electrode projecting from the end of a gas nozzle and/or the diameter of a cylindrical part of the welding electrode. These parameters are optimal for frequently used conically pointed welding electrodes or welding needles for assessing the wear of the welding electrode. In the case of specially designed welding electrodes, however, other parameters can also be used to assess the wear and can be taken into account in image processing.

According to a further feature of the invention, a warning signal, in particular an acoustic or optical warning signal, is output as a signal. In this way, a welder can be made aware of a progressive wear of the welding electrode, so that appropriate measures, such as grinding the welding electrode or replacing the welding electrode, can be taken in good time. As a result, a high welding quality of the welding process can also be ensured.

Likewise, a control signal for the automated arc welding apparatus can be output as a signal. Depending on the type of wear of the welding electrode, a high welding quality can be maintained, for example, by approaching the welding torch to the workpiece by the control signal, despite the beginning of wear of the welding electrode, without having to immediately rework or replace the welding electrode. As a result, the service life or effective duration of the welding process can be increased.

Alternatively or additionally, also a switch-off signal for the automated arc welding apparatus can be output as a signal. Such a switch-off signal can be output, for example, in the event of unacceptably large deviations of the shape and, at most, position of the end of the welding electrode from the predefined shape and, at most, position, in order to be able to prevent damage to the workpiece. For example, in the event of impermissible wear of the welding electrode, a continuation of the welding process with poor welding quality and thus rejection of workpieces or reworking of the workpiece can be prevented by switching off the welding current source and the welding robot or the like.

According to another embodiment of the method according to the invention, it is provided that the signal is changed as a function of the deviation of the determined shape of the end of the welding electrode from the predefined shape of the end of the welding electrode and/or as a function of the deviation of the determined position of the end of the welding electrode from the predefined position of the end of the welding electrode. In this way, the signal can be adapted to the degree of the determined deviation. In the case of an acoustic signal, for example, the volume or frequency of the issued warning signal or, in the case of an optical signal, the colour, luminous intensity or flashing frequency can be adapted to the degree of wear of the welding electrode. As a result, the operating personnel receive additional information about the degree of wear.

The images of the end of the welding electrode can be captured, for example, during the polarity change of an AC welding process. During these phases, the quality of the image can be increased due to the brief extinction of the arc during the polarity change.

In a pulsed welding process, the images of the end of the welding electrode are preferably captured during process phases of the welding process with a lower welding current, for example during base current phases. Such a special triggering of the camera images also makes it possible to improve the quality of the captured images and consequently to better monitor and assess the state of the end of the welding electrode.

The predefined shape and possibly the predefined position of the end of the welding electrode can be determined and stored by capturing images of the end of a new welding electrode before carrying out the welding process. In this case, the images can be captured after the clamping of a new welding electrode or can also be downloaded from a database made available, for example, by the manufacturer of the welding electrode.

If the at least one camera is calibrated before capturing the images of the welding electrode, an absolute assessment of the welding electrode can be made via the camera images. The calibration can be carried out, for example, before the start of the welding process by capturing suitable calibration patterns. After calibration, the distance of the camera from the workpiece must be kept constant according to the distance of the camera from the calibration pattern.

The quality of the images can be improved by activating at least one light source at least when capturing the images of the welding electrode. By means of a flash lamp or light-emitting diode arrays, a brightening of the desired region and thus an increase in contrast can be achieved.

Preferably, the images of the welding electrode are captured every 0.01 s to 10 s and preferably with an image repetition frequency between 10 Hz and 100 Hz. These values represent a sufficiently good quality of the captured images with a simultaneously manageable memory requirement and computational effort.

The object according to the invention is also achieved by the above-mentioned monitoring apparatus, wherein the image processing apparatus is designed to cut out and/or weight sub-areas from at least two images captured at different exposure times and to combine the sub-areas to form a composite image, and the image processing apparatus being connected to a signal apparatus which is designed to output a signal in the event of a deviation of the determined shape of the end of the welding electrode from the predefined shape of the end of the welding electrode. Such a device can be implemented relatively easily with already existing components of the welding apparatus. Reference is made to the above description of the monitoring method with regard to the advantages which can be achieved thereby.

Advantageously, the image processing apparatus is designed for determining the position of the end of the welding electrode from the reprocessed images and for comparison with a predefined position of the end of the welding electrode, and the image processing device is connected to a signal device which is designed for outputting a signal when the determined position of the end of the welding electrode deviates from the predefined position of the end of the welding electrode.

The signal device can be formed by a warning signal device, in particular a loudspeaker for outputting an acoustic warning signal as a signal or by a display for outputting an optical warning signal as a signal.

Furthermore, the signal device can be formed by a control device connected to the automated arc welding apparatus for outputting a control signal as a signal. As already mentioned above, the control signal can react to a detected wear or a deviation from the desired position (Tool Center Point, TCP) of the non-melting welding electrode, for example the welding torch can be moved closer to the surface of the workpiece to be machined by appropriate control of the manipulator (robot, linear running gear, bogie or the like). As a result, the wear of the welding electrode can be compensated to a certain extent and an equal or sufficient welding quality can be achieved. In the event of unacceptable wear of the welding electrode, the welding process can also be stopped and rejection of the workpiece due to unacceptable welding quality can be prevented.

Preferably, a calibration device is provided for calibrating the at least one camera before capturing the images of the welding electrode. After such a calibration of the camera, an absolute evaluation of the welding electrode can be achieved on the basis of the camera images.

If at least one light source is provided, the image quality can be improved. Possible light sources are, for example, flash lamps which are actuated in synchronism with the camera, or light-emitting diodes or arrays of light-emitting diodes. The at least one camera is preferably designed to capture images of the welding electrode every 0.01 s to 10 s and preferably with an image repetition frequency between 10 Hz and 100 Hz, in order to obtain images of sufficient quality, but to keep the storage and computing requirements low.

The present invention is explained in more detail with reference to the appended drawings. In the figures.

Figure 4A:
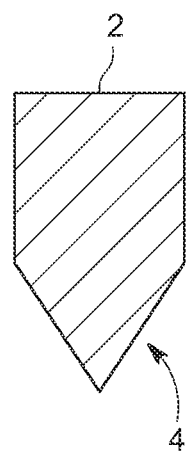
Figure 4B:
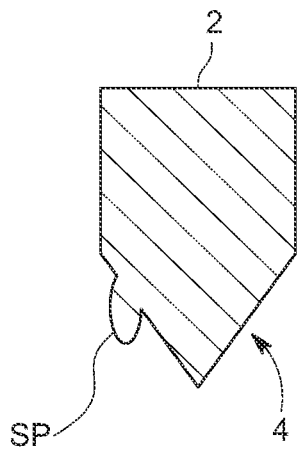
Figure 4C:
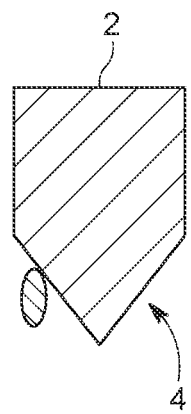

FIGS. 4A-4C schematically show the camera images to be compared in the monitoring of the non-melting welding electrode.

Figure 1:
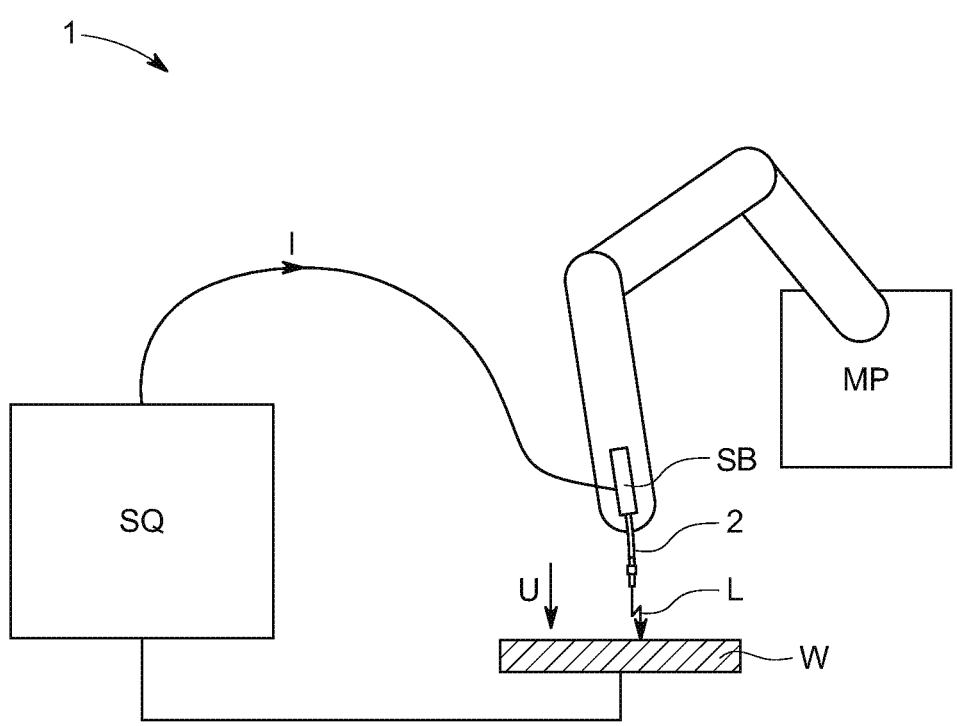
FIG. 1 shows a schematic block diagram of an automated arc welding apparatus having a non-melting welding electrode.

FIG. 1 shows a schematic block diagram of an automated arc welding apparatus 1 with a non-melting welding electrode 2, in particular a TIG (tungsten inert gas) welding device with a tungsten electrode. A current source SQ is connected both to the non-melting welding electrode 2 arranged on the welding torch SB and to the workpiece W of electrically conductive material. For carrying out an automated welding process, the welding torch SB is connected to a manipulator MP, such as a robot, linear running gear, bogie or the like, via which the welding torch SB is moved along a predetermined welding path over the workpiece W. The current source SQ generates a welding current I between the non-melting electrode and the workpiece W, as a result of which an arc L is ignited between the end of the non-melting welding electrode and the surface of the workpiece W. The time sequences are controlled and the respective values of the welding current I and of the welding voltage U are regulated via a control device (not shown) which is usually located in the current source SQ. In order to connect two workpieces W to one another or to apply a layer to the surface of the workpiece W, a melting material is usually fed into the arc L in wire form and melted in the arc L (not shown).

While in manual welding processes the state of the welding electrode can be continuously assessed by the welder and it can be estimated when grinding of the electrode tip or replacement of the welding electrode is necessary, in automated welding processes this must be done via camera images. Due to the bright arc, however, evaluation of the camera images during the welding process has hitherto been impossible or inadequately possible.

Figure 2:
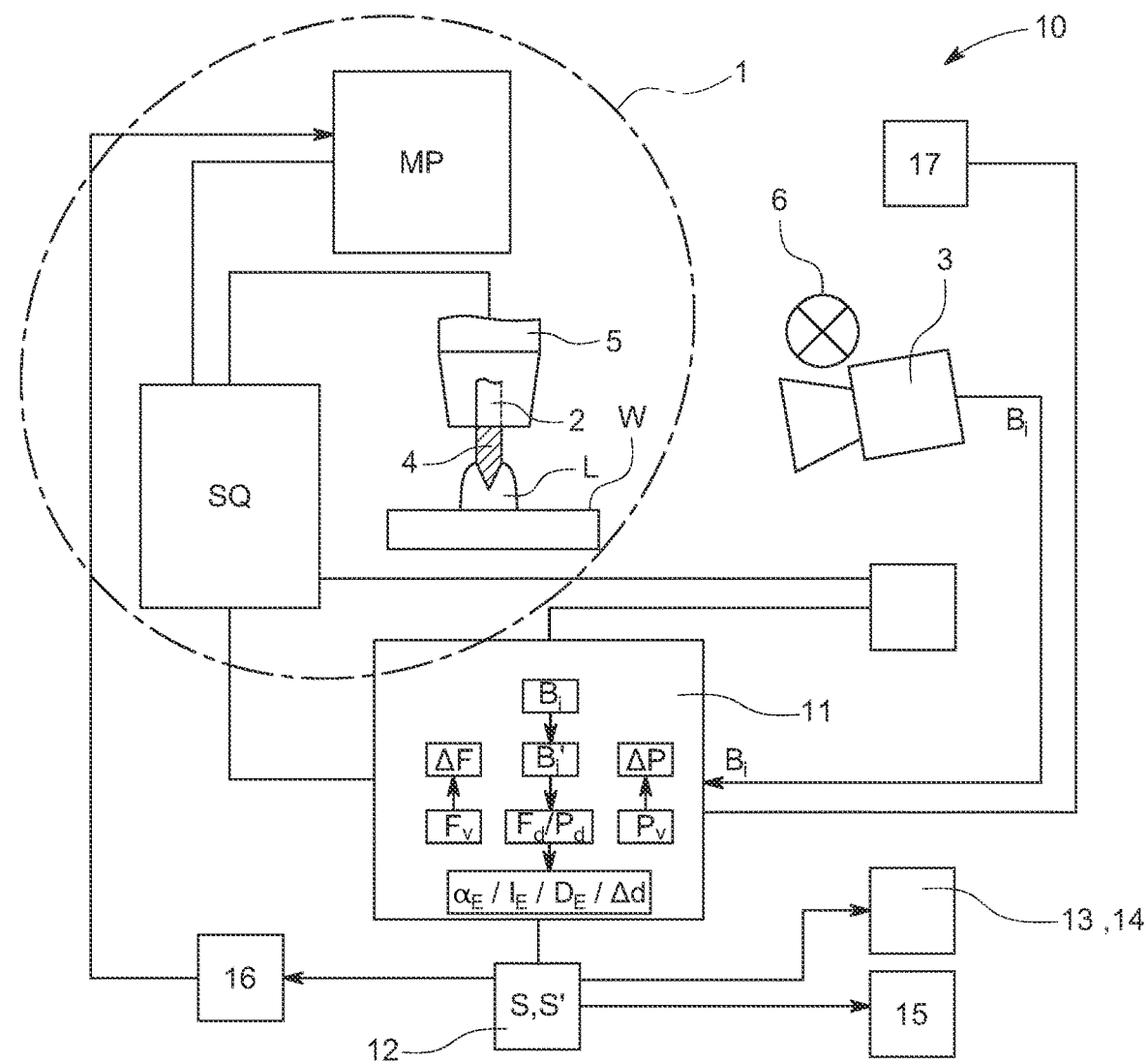
FIG. 2 shows a block diagram of an apparatus according to the invention for monitoring the non-melting welding electrode of an automated arc welding apparatus.

FIG. 2 shows a block diagram of an apparatus 10 according to the invention for monitoring the non-melting welding electrode 2 of an automated arc welding apparatus 1. During the welding process, images $B_i$ of the non-melting welding electrode 2 or of the end 4 of the welding electrode 2 are captured with at least one camera 3. A light source 6 for illuminating the welding region can be arranged on the at least one camera 3 or in the vicinity. In an image processing device 11, the images $B_i$ captured with the camera 3 are processed in order to achieve a quality of the images $B_i$ which, despite the arc L, allow an analysis and a conclusion to be drawn therefrom as to the state of the welding electrode 2. The at least one camera 3 is designed to capture the images $B_i$ of the welding electrode 2 during the welding process carried out with the arc welding apparatus 1. The capture of the images $B_i$ can be carried out in process phases of the welding process during which the arc does not burn or burns only weakly, for example during short-circuit phases or base current phases of a welding process. The image processing device 11 is used for the corresponding reprocessing of the images $B_i$ and extraction of the arc L of the welding process. Furthermore, the shape $F_d$ and, if necessary, the position $P_d$ of the end 4 of the welding electrode 2 are determined in the image processing device 11 from the reprocessed images $B_i'$. Thereafter, the determined shape $F_d$ and possibly position $P_d$ of the end 4 of the welding electrode 2 is compared with a predefined shape $F_v$ and possibly predefined position $P_v$ of the end 4 of the welding electrode 2 and the corresponding deviation $\Delta F$ of the shape and possibly deviation $\Delta P$ of the position is calculated. The image processing device 11 is connected to a signal device 12 which serves to output a signal S as soon as the deviation $\Delta F$ of the shape or deviation $\Delta P$ of the position of the end 4 of the welding electrode 2 exceeds a certain amount. The processing takes place continuously during the welding process. Since the state of the welding electrode 2 does not change abruptly, a time delay in the reprocessing of the images $B_i$ is not a problem or an evaluation in real time is not necessary.

The signal device 12 can be formed by a warning signal device 13, in particular a loudspeaker 14, for outputting an acoustic warning signal as a signal S in the event of a deviation $\Delta F$ of the shape of the end 4 of the welding electrode 2 or as a signal S' in the event of a deviation $\Delta P$ of the position of the end 4 of the welding electrode 2. Alternatively or in addition to the warning signal device 13, a display 15 may also be connected to the signal device 12 for outputting an optical warning signal as a signal S or S'. Furthermore, a control device 16 can be connected to the signal device 12, via which a control signal can be emitted as a signal S, S' to the automated arc welding apparatus 1 if wear of the welding electrode 2 has been detected.

The signal device 12 thus continuously observes the welding process, so that wear of the welding electrode 2 is also monitored. Accordingly, it is possible to report on the state of the welding electrode 2 by means of warning stages (for example via a traffic light system). This takes place, for example, after each welding process or after predefined times when a welding process (such as, for example, build-up welding) lasts for a long period of time. The signal device 12 thus informs about the current state of the welding electrode 2 and, for example, issues recommendations as to when the welding electrode 2 is to be changed or machined.

Calibration of the camera 3 before capturing the images $B_i$ of the welding electrode 2 can be carried out via a calibration device 17, for example via corresponding calibration patterns.

Figure 3:
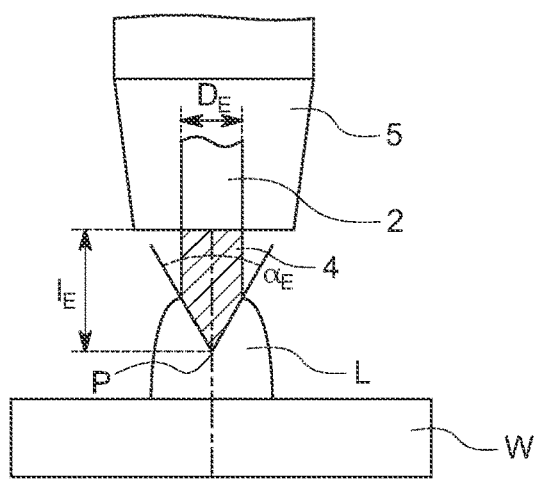
FIG. 3 shows a view of the end of a non-melting welding electrode.

FIG. 3 shows a view of the end 4 of a non-melting welding electrode 2. In order to determine the shape F of the end 4 of the welding electrode 2, the angle $\alpha_E$ of a tip of the welding electrode 2 and/or the length $l_E$ of the welding electrode 2 projecting from the end of a gas nozzle 5 and/or the diameter $D_E$ of a cylindrical part of the welding electrode 2 can be determined from the images $B_i$.

FIG. 4A schematically shows a reference image of the end 4 of a welding electrode 2, in particular the image of a new welding electrode 2. FIG. 4B shows a current image of the end 4 of the welding electrode 2, with a welding splatter SP adhering to the tip of the welding electrode. By means of the image processing device 11, a difference of the current image of the welding electrode 2 according to FIG. 4B and the reference image according to FIG. 4A is now generated (see FIG. 4C). The difference image according to FIG. 4C can now be used to determine the deviation $\Delta F$ of the determined shape $F_d$ of the end of the welding electrode (FIG. 4B) from the predefined shape $F_v$ of the end of the welding electrode (FIG. 4A), and a signal S can be output when a specific deviation is exceeded. This signal S can be changed as a function of the deviation $\Delta F$ of the shape.

FIG. 4C also shows that the diameter $D_E$ of the welding electrode 2 can change. Particularly in the case of welding processes with a long duration, a layer which increases the diameter $D_E$ can form on the welding electrode 2 owing to the adhesion of welding spatter, which is distributed over the surface. Likewise, the difference image according to FIG. 4C can be used to determine the deviation $\Delta P$ of the determined position $P_d$ of the end 4 of the welding electrode 2 (FIG. 4B) from the predefined position $P_v$ of the end of the welding electrode, and a signal S' can be output or generated. Also this signal S can be changed as a function of the deviation $\Delta P$ of the position.

The present invention allows a quick and reliable determination of the state of the welding electrode during the welding process of an automated arc welding apparatus and thus ensures a constant optimum welding quality.

The invention claimed is:

1. A method for monitoring a non-melting welding electrode (2) of an automated arc welding apparatus (1), wherein with the aid of at least one camera (3), images ($B_i$) of the welding electrode (2) are captured and the images ($B_i$) are processed and the state of the welding electrode (2) is concluded therefrom, and the images ($B_i$) of the welding electrode (2) are captured during a welding process carried out with the arc welding apparatus (1), the images ($B_i$) are reprocessed and the arc (L) of the welding process is extracted, and the shape ($F_d$) of the end (4) of the welding electrode (2) is determined from the reprocessed images ($B_i'$) and compared with a predefined shape ($F_v$) of the end (4) of the welding electrode (2), wherein the images ($B_i$) are reprocessed by capturing at least two images with different exposure times, cutting out and/or weighting partial areas from the at least two images with different exposure times, and combining them to form a composite image and, in the event of a deviation ($\Delta F$) of the determined shape ($F_d$) of the end (4) of the welding electrode (2) from the predefined shape ($F_v$) of the end (4) of the welding electrode (2), a signal is output.

2. The monitoring method according to claim 1, wherein the position of the end (4) of the welding electrode (2) is determined from the reprocessed images ($B_i'$) and compared with a predefined position ($P_v$) of the end (4) of the welding electrode (2), and a signal is output in case of deviation ($\Delta P$) of the determined position ($P_d$) of the end (4) of the welding electrode (2) from the predefined position ($P_v$) of the end (4) of the welding electrode (2).

3. The monitoring method according to claim 1 wherein the shape (F) of the end (4) of the welding electrode (2) is determined by the angle ($\alpha_E$) of a tip of the welding electrode (2) and/or the length ($l_E$) of the welding electrode (2) projecting from the end of a gas nozzle (5) and/or the diameter ($D_E$) of a cylindrical part of the welding electrode (2).

4. The monitoring method according to claim 1, wherein a warning signal, a control signal for the automated arc welding apparatus (1) and/or a switch-off signal for the automated arc welding apparatus (1) is output as the signal (S, S').

5. The monitoring method according to claim 4, wherein an acoustic or optical warning signal, is output as the signal (S, S').

6. The monitoring method according to claim 1, wherein the signal (S, S') is changed as a function of the deviation ($\Delta F$) of the determined shape ($F_d$) of the end (4) of the welding electrode (2) from the predefined shape ($F_v$) of the end (4) of the welding electrode (2) and/or as a function of the deviation ($\Delta P$) of the determined position ($P_d$) of the end (4) of the welding electrode (2) from the predefined position ($P_v$) of the end (4) of the welding electrode (2).

7. The monitoring process according to claim 1, wherein the images ($B_i$) of the end (4) of the welding electrode (2) are captured during the polarity change of an AC welding process.

8. The monitoring method according to claim 1, wherein the images ($B_i$) of the end (4) of the welding electrode (2) are captured during process phases of the welding process with lower welding current (1).

9. The monitoring method according to claim 1, wherein the predefined shape ($F_v$) and the predefined position ($P_v$) of the end (4) of the welding electrode (2) are determined and stored by capturing images of the end (4) of a new welding electrode (2) before the welding process is carried out.

10. The monitoring method according to claim 1, wherein the at least one camera (3) is calibrated before capturing the images ($B_i$) of the welding electrode (2).

11. The monitoring method according to claim 1, wherein the non-melting welding electrode comprises a tungsten electrode.

12. The monitoring method according to claim 1, wherein the automated arc welding apparatus comprises a TIG welding apparatus.

13. An apparatus (10) for monitoring a non-melting welding electrode (2) of an automated arc welding apparatus (1) having at least one camera (3) for capturing images ($B_i$) of the welding electrode (2) and an image processing device (11) for processing the images ($B_i$) and for obtaining a conclusion therefrom as to the state of the welding electrode (2), wherein the at least one camera (3) is configured for capturing the images ($B_i$) of the welding electrode (2) during a welding process carried out with the arc welding apparatus (1), the image processing device (11) being configured for reprocessing the images ($B_i$) and extracting the arc (L) of the welding process and for determining the shape ($F_d$) of the end (4) of the welding electrode (2) from the reprocessed images ($B_i'$) and for comparison with a predefined shape ($F_v$) of the end (4) of the welding electrode (2), wherein the image processing device (11) is configured for cutting and/or weighting sub-areas from at least two images captured with different exposure time and for combining the sub-areas to form a composite image, and the image processing device (11) is connected to a signal device (12) configured for outputting a signal (S) in the event of deviation ($\Delta F$) of the determined shape ($F_d$) of the end (4) of the welding electrode (2) from the end (4) of the welding electrode (2) formed by the predefined shape (Fv) of the end (4) of the welding electrode (2).

14. The monitoring apparatus (10) according to claim 13, wherein the image processing device (11) is designed for determining the position ($P_d$) of the end (4) of the welding electrode (2) from the reprocessed images ($B_i'$) and for comparison with a predefined position ($P_v$) of the end (4) of the welding electrode (2), and the image processing device (11) is connected to a signal device (12) which is designed for outputting a signal (S') in case of deviation ($\Delta F$) of the determined position ($P_d$) of the end (4) of the welding electrode (2) from the predefined position ($P_v$) of the end (4) of the welding electrode (2).

15. The monitoring apparatus (10) according to claim 13, wherein the signal device (12) is formed by a warning signal device (13) for outputting an acoustic warning signal as a signal (S, S') or by a display (15) for outputting an optical warning signal as a signal (S, S').

16. The monitoring apparatus (10) according to claim 13, wherein at least one light source (6) is provided.

17. The monitoring apparatus (10) according to claim 13, wherein the non-melting welding electrode comprises a tungsten electrode.

18. The monitoring apparatus (10) according to claim 13, wherein the automated arc welding apparatus comprises a TIG welding apparatus.

19. The monitoring apparatus (10) according to claim 13, wherein the signal device (12) is formed by a loudspeaker (14).

\* \* \* \* \*